United States Patent
Gilbert-Eyres et al.

(10) Patent No.: US 10,300,888 B1
(45) Date of Patent: May 28, 2019

(54) PERFORMING REMOTE VEHICLE COMMANDS USING LIVE CAMERA SUPERVISION

(71) Applicant: GM GLOBAL TECHNOLOGY OPERATIONS LLC, Detroit, MI (US)

(72) Inventors: Matthew E. Gilbert-Eyres, Rochester Hills, MI (US); Huong T. Chim, Royal Oak, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/913,442

(22) Filed: Mar. 6, 2018

(51) Int. Cl.
*B60R 25/10* (2013.01)
*B60R 25/24* (2013.01)
*H04N 7/18* (2006.01)
*B60R 16/037* (2006.01)
*G06F 3/0488* (2013.01)

(52) U.S. Cl.
CPC .......... *B60R 25/245* (2013.01); *B60R 16/037* (2013.01); *H04N 7/185* (2013.01); *G06F 3/0488* (2013.01)

(58) Field of Classification Search
CPC .... B60R 25/245; B60R 16/037; H04N 7/185; G06F 3/0488
USPC .................................................. 340/426.14
See application file for complete search history.

(56) References Cited

U.S. PATENT DOCUMENTS

| | | | | |
|---|---|---|---|---|
| 8,137,008 B1* | 3/2012 | Mallano | .................. | B60R 11/04 396/427 |
| 8,903,568 B1* | 12/2014 | Wang | .................. | G05D 1/0016 701/2 |
| 9,747,901 B1* | 8/2017 | Gentry | .................... | G10L 15/22 |
| 2006/0223637 A1* | 10/2006 | Rosenberg | .............. | A63F 13/10 463/47 |
| 2013/0222591 A1* | 8/2013 | Alves | ...................... | B61L 23/00 348/148 |
| 2013/0303131 A1* | 11/2013 | Sadhu | ..................... | G06F 19/00 455/414.1 |
| 2014/0058613 A1* | 2/2014 | Leinfelder | ........... | B62D 15/028 701/28 |
| 2015/0169968 A1* | 6/2015 | Michmerhuizen | ......................... | G06K 9/00805 348/148 |
| 2016/0117853 A1* | 4/2016 | Zhong | .................. | B64C 39/024 345/634 |

(Continued)

*Primary Examiner* — Zhen Y Wu
(74) *Attorney, Agent, or Firm* — Reising Ethington P.C.; David Willoughby

(57) ABSTRACT

A system and method for performing remote vehicle commands such as opening and closing doors and windows. The method is carried out by the system and includes the steps of: receiving a first signal at a vehicle from a remote application via a wireless communication device installed in the vehicle as a part of the vehicle electronics; in response to receiving the first signal, transmitting a camera feed from one or more vehicle cameras on the vehicle to the remote application; receiving a remote command signal at the vehicle from the remote application; in response to receiving the remote command signal, performing one or more vehicle commands at the vehicle while continuing to transmit the camera feed from the vehicle to the remote application; and ending the transmission of the camera feed from the vehicle to the remote application after completing the one or more remote vehicle commands.

16 Claims, 4 Drawing Sheets

(56) References Cited

U.S. PATENT DOCUMENTS

| | | | |
|---|---|---|---|
| 2016/0214535 A1* | 7/2016 | Penilla | G06Q 20/18 |
| 2016/0227127 A1* | 8/2016 | Hyttinen | H04N 5/247 |
| 2016/0272135 A1* | 9/2016 | Kim | G05B 15/02 |
| 2017/0086048 A1* | 3/2017 | Cho | H04W 64/00 |
| 2017/0154477 A1* | 6/2017 | Chung | G07C 5/008 |
| 2017/0309088 A1* | 10/2017 | Arya | H04L 43/0811 |
| 2018/0028931 A1* | 2/2018 | Bear | H04N 5/445 |
| 2018/0029706 A1* | 2/2018 | Baruch | H04W 76/14 |
| 2018/0096611 A1* | 4/2018 | Kikuchi | G08G 5/045 |
| 2018/0114448 A1* | 4/2018 | Jager | G05D 1/0202 |
| 2018/0137596 A1* | 5/2018 | Chenu | B61L 15/0027 |
| 2018/0150994 A1* | 5/2018 | Foutzitzis | H04N 5/23238 |
| 2018/0181118 A1* | 6/2018 | Yoneda | B60W 30/00 |
| 2018/0203442 A1* | 7/2018 | Kotlyarov | G08B 13/1966 |
| 2018/0231982 A1* | 8/2018 | Yunoki | G05D 1/02 |
| 2018/0236666 A1* | 8/2018 | Mozeika | B25J 9/1697 |
| 2018/0279105 A1* | 9/2018 | Huber | H04W 4/90 |

\* cited by examiner

PERFORMING REMOTE VEHICLE COMMANDS USING LIVE CAMERA SUPERVISION

INTRODUCTION

The disclosure relates to remotely commanding vehicle operations using live camera supervision.

The use of wirelessly-connected personal mobile devices such as smartphones has brought with it the ability to remotely control certain vehicle operations, such as remote starting and cabin climate control, and door locking and unlocking. Other vehicle operations that involve physical movement of a liftgate, trunk, window, or other vehicle component are not remotely controllable via these personal mobile devices due to voluntary or mandatory restrictions on performing such operations when the vehicle operator is not physically present at the vehicle. This helps avoid unintended contact of the vehicle component with obstructions.

SUMMARY

According to a first aspect of the invention, there is provided a method for performing remote vehicle commands at a vehicle. The method includes the steps of: receiving a first signal at a vehicle from a remote application via a wireless communication device installed in the vehicle as a part of the vehicle electronics; in response to receiving the first signal, transmitting a camera feed from one or more vehicle cameras on the vehicle to the remote application via cellular communication over a wireless carrier system or via short range wireless communication via a wireless network access point; receiving a remote command signal at the vehicle from the remote application; in response to receiving the remote command signal, performing one or more vehicle commands at the vehicle while continuing to transmit the camera feed from the vehicle to the remote application; and ending the transmission of the camera feed from the vehicle to the remote application after completing the one or more remote vehicle commands.

According to various embodiments, this method may further include any one or more of the following features in any technically feasible combination:
- the performing step further comprises physically moving an internal or external vehicle component while transmitting a camera feed of the moving vehicle component to the remote application.
- the vehicle component is one of a door, trunk lid, liftgate, window, sunroof, moonroof, or convertible top of the vehicle, and wherein the camera feed provides video showing the vehicle component as it moves.
- the performing step is carried out only during simultaneous bi-directional communication between the vehicle and the remote application that includes sending of the camera feed from the vehicle to the remote application and receiving a command signal from the remote application at the vehicle.
- the method further includes the step of emitting an audible warning, a visual warning, or both at the vehicle while conducting the one or more remote vehicle commands at the vehicle.
- the method further includes, prior to the transmitting step, the step of verifying that a quality of connection between the vehicle and the remote application is above a threshold.
- the method further includes the step of ceasing performance of one or more vehicle commands based on an input from a vehicle sensor.
- the method further includes continuously receiving the remote vehicle command signal while the vehicle conducts the one or more remote vehicle commands.
- the method further includes the step of ceasing performance of one or more vehicle commands in response to an interruption or stoppage of receipt of the remote vehicle command.

According to a second aspect of the invention, there is provided a method for performing remote vehicle commands using a personal mobile device. The method includes the steps of: receiving from a user at a personal mobile device a selected remote vehicle command that involves physical movement of at least one vehicle component of a vehicle; sending a first signal to the vehicle to activate one or more vehicle cameras on the vehicle; receiving a camera feed from the vehicle cameras; displaying the camera feed to the user on the personal mobile device; during the display of the camera feed, receiving a further input from the user requesting that the selected remote vehicle command be carried out and sending a command signal to the vehicle to begin the selected remote vehicle command; and continuing to display the camera feed to the user while the selected remote vehicle command is performed by the vehicle.

According to various embodiments, the method of the preceding paragraph may further include any one or more of the following features in any technically feasible combination:
- the steps are carried out via a vehicle remote control application executing on the personal mobile device, wherein, prior to the sending step, the remote control application transmits user identification information to a remote facility that authorizes the user's access to the vehicle to carry out the selected remote vehicle command.
- the camera feed is displayed on a touchscreen of the personal mobile device and wherein the method further comprises the step of displaying a button on the touchscreen while displaying the camera feed to the user.
- the step of sending the command signal to the vehicle is carried out only while the user presses the button on the touchscreen.
- the step of sending the command signal further comprises continuously sending the command signal only while the user presses the button on the touchscreen and the camera feed is being displayed on the touchscreen.
- the method further includes the step of monitoring a quality of connection of the camera feed.
- the method further includes determining that the quality of connection of the camera feed has dropped below a threshold and in response thereto, either stopping transmission of the command signal or sending a stop command to the vehicle so as to cause the vehicle to cease conducting the selected remote vehicle command.
- the method further includes the step of providing a notification to the user via the personal mobile device that the quality of connection of the camera feed has dropped below the threshold.
- the method further includes the steps of receiving a completion signal at the personal mobile device after the vehicle has performed the selected remote vehicle command, and displaying a notification on the personal mobile device indicating that the selected remote vehicle command was completed.

BRIEF DESCRIPTION OF THE DRAWINGS

Exemplary embodiments will hereinafter be described in conjunction with the appended drawings, wherein like designations denote like elements, and wherein.

DETAILED DESCRIPTION

Figure 1:
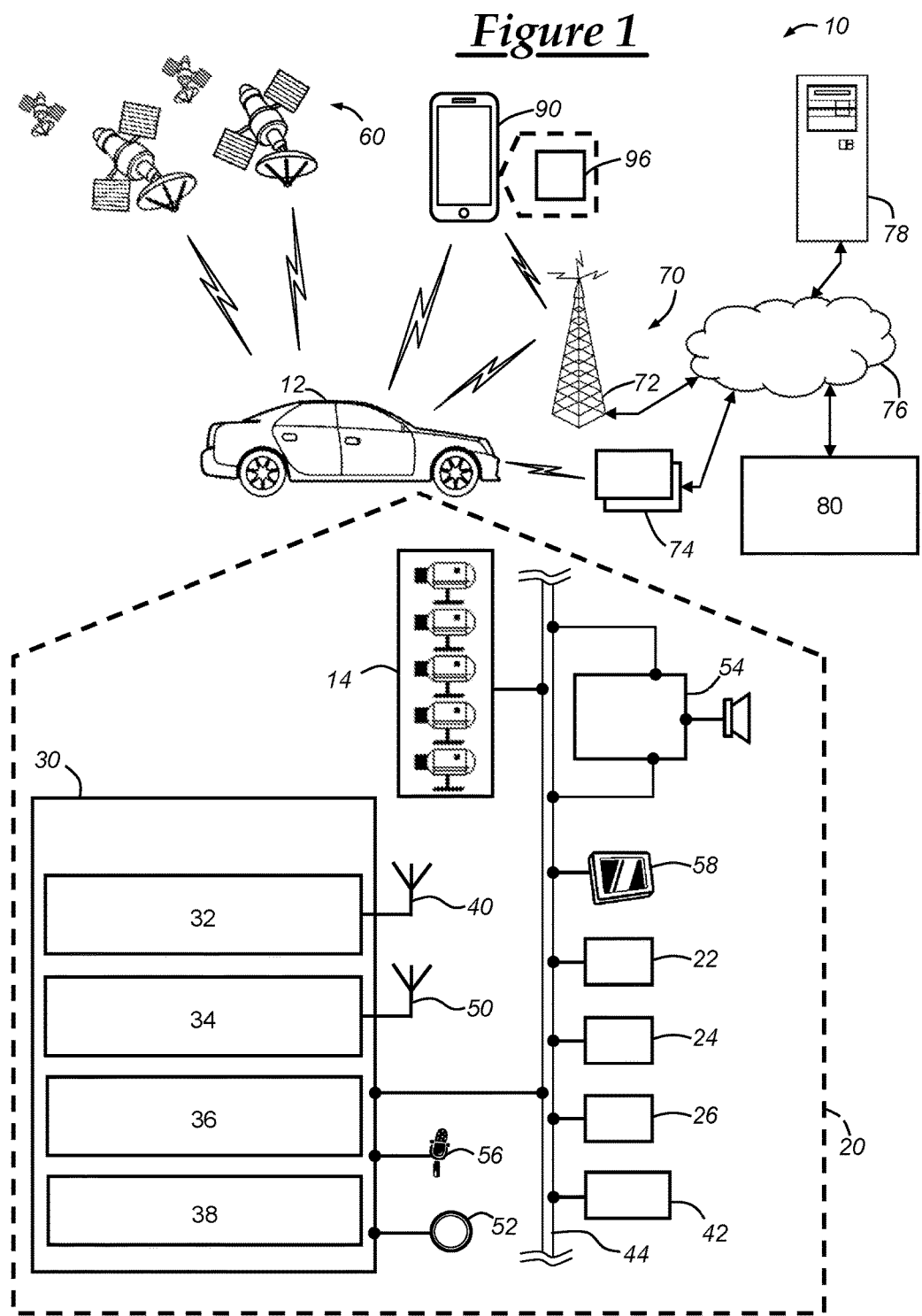
FIG. 1 is a block diagram depicting an embodiment of a communications system that includes a vehicle and a personal mobile device and that is capable of carrying out the methods disclosed herein.

The system and methods described below enable a user to remotely initiate and monitor vehicle commands that involve physical movement of a vehicle component. Exemplary vehicle components include exterior vehicle components such as rear closures (e.g., a trunk lid or liftgate), doors, windows, sunroofs, moonroofs, convertible tops, as well as interior vehicle components such as seats and steering wheels. The monitoring provided by the system and methods described below may include the use of a live camera feed from one or more vehicle mounted cameras to enable the user to remotely observe the vehicle and/or its surroundings at the initiation of the command and to remotely monitor or supervise the physical movement of the vehicle component while the command is being performed remotely at the vehicle. As will be apparent from the discussion below, this system and method improves the functionality of the personal mobile device by enabling both the remote commanding and supervision of vehicle operations for which the presence of the user at the vehicle has heretofore been required. This may be carried out by providing the personal mobile device with live sensor data from the vehicle that enables the vehicle operation to be supervised remotely in real time as it is performed. This improvement in the functioning of the personal mobile device and the vehicle itself may be implemented via a vehicle remote control application that includes technical enhancements relative to that now known and used. In doing so, the invention provides a technical solution to a problem that has heretofore limited the use of smartphones and the like in carrying out the full complement of desired remotely-commanded vehicle operations.

In an embodiment described herein, the following steps are carried out at the vehicle in response to commands sent by a user via a vehicle remote control application (remote application) installed on a smartphone or other personal mobile device. Initially, the vehicle receives a first signal from the remote application. This signal is, in effect, a command request signal that tells the vehicle that a remote vehicle command is being requested that requires a live camera feed from the vehicle. In response, the vehicle then transmits the live camera feed from one or more vehicle cameras located either inside or on the exterior of the vehicle to the remote application. While continuing to transmit the one or more camera feeds to the remote application, the vehicle then receives a selected remote vehicle command signal from the remote application and in response, begins performing the selected remote vehicle command at the vehicle. After the remote vehicle command is complete, the vehicle stops transmitting the live camera feed from the one or more cameras. During this process, the user is able to monitor performance of the selected vehicle command in real time using the live camera feed rather than needing to be within eyesight of the vehicle. In some embodiments, the vehicle may also emit an audible warning, a visual warning, or both to further improve monitored operation of the remote vehicle command.

At the smartphone, the remote application offers options to the user for sending one or more remote vehicle commands to the vehicle. The remote application enables monitored operation of the remote vehicle commands by sending a first signal to the vehicle to activate one or more of the vehicle cameras, receiving the live feed from the one or more vehicle cameras, and displaying the feed to the user while operation of the remote vehicle commands is conducted. In some embodiments, the application further ensures monitored operation of the remote vehicle commands by requiring a user to not only press a button on the smartphone to initiate remote vehicle command, but to continue to hold the button during the continuing camera feed for the duration of the performance of the remote vehicle command, failing which the remote application may send a signal (or interrupt the sending of a continuous or repeated signal) to stop the remote vehicle command. This stopping of carrying out the vehicle command may also be done if the camera feed is interrupted or the lag time is too great.

Referring now to FIG. 1, there is shown an operating environment that comprises a communications system 10 and that can be used to implement the method disclosed herein. Communications system 10 generally includes a vehicle 12 with a camera system 14 and a wireless communications device 30, a constellation of global navigation satellite system (GNSS) satellites 60, one or more wireless carrier systems 70, a plurality of public and/or private network access points 74, a land communications network 76, a computer 78, a remote facility 80, and a personal mobile device 90. It should be understood that the disclosed method can be used with any number of different systems and is not specifically limited to the operating environment shown here. Also, except for features and functions described herein, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that connects wireless carrier system 70 and the wireless access points (WAPs) 74 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a remote server accessible by vehicle 12. Other such accessible computers 78 can be, for example: a public key infrastructure (PKI) server used to generate security entitlements; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses dynamic host configuration protocol (DHCP) or other suitable protocol to assign an IP address to the vehicle 12.

Remote facility 80 may be designed to provide the vehicle electronics 20 and personal mobile device 90 with a number of different system back-end functions through use of one or more electronic servers. For example, remote facility 80 may be used in implementing the remote vehicle commands and monitoring described herein. In particular, remote facility 80 may coordinate communication between the personal mobile devices and their associated vehicles, so that when the remote application 96 is in use on the personal mobile device 90, the application communicates commands to the remote facility 80 which then communicates with the vehicle 12. Responses from the vehicle may also be sent via the remote facility 80 to the remote application 96, including success or failure notifications for the particular vehicle command sent, and possibly the live camera feed itself. In some embodiments, all or most communications between the remote application 96 and vehicle 12 may by via the remote facility 80. In this way, the remote facility may control the authorization and/or authentication of the user or the user's personal mobile device as well as the sending of commands and notifications between the remote application 96 and vehicle 12. In other embodiments, the remote application 96 may also or instead communicate directly with the vehicle 12 without using remote facility 80 to authorize or pass through all commands or other communications. Thus, for example, the remote facility 80 may be used for initial authorization/authentication of the user and/or user's personal mobile device, with certain other communications (e.g., the camera feed) being sent directly from the vehicle 12 to the remote application 96 without going to, or through, the remote facility 80. Techniques using automatic login of the remote application 96 to the remote facility and credentials/keys that permit authentication and confidentiality between the vehicle 12, remote facility 80, and remote application 96 will be apparent to those skilled in the art.

In one particular embodiment, the remote application 96 may initially communicate with the remote facility 80 to check availability or authorization for the remote application 96 to be able to remotely command vehicle 12. This may include the remote facility 80 using data from the remote application 96 to determine which vehicle the application 96 is seeking to control, and this may be done via login information provided from the application to the remote facility 80. This may also include verifying subscriber account information, such as whether the user has an active account and is subscribed to a service that permits the particular remote vehicle command being requested. The remote application 96 may also send the particular requested vehicle command to the remote facility 80, which then contacts the vehicle 12. In the event of a command such as door unlocking, the remote facility 80 may simply send the command to the vehicle 12 to be carried out, and then receive back and send to the application 96 a success notification once the unlock command is completed, or otherwise send a failure notification. For a remote vehicle command that involves physical movement of a vehicle component, such as opening of the vehicle's trunk, the remote facility 80 may send the vehicle a first signal informing the vehicle of the requested trunk opening command. In response, the vehicle does not carry out the command, but instead initiates the camera feed. In some embodiments, the camera feed may be sent directly from the vehicle 12 to the remote application 96 without being sent to, or through, the remote facility. This may be useful in minimizing latency of the camera signal and increasing privacy of the transmitted video. The actual transmission of the vehicle command from the remote application to the vehicle during the live camera feed may be sent via the remote facility 80 or directly without going to, or through, the remote facility.

In carrying out its operations, the remote facility 80 may include one or more switches, servers, databases, live advisors, as well as an automated voice response system (VRS), all of which are known in the art. Each of these various components are coupled to one another via a wired or wireless local area network. Remote facility 80 may receive and transmit data via a modem connected to land network 76. A database at the remote facility can store account information such as subscriber authentication information, vehicle identifiers, available remote vehicle commands based on vehicle model, etc., and other pertinent subscriber information. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Figure 3:
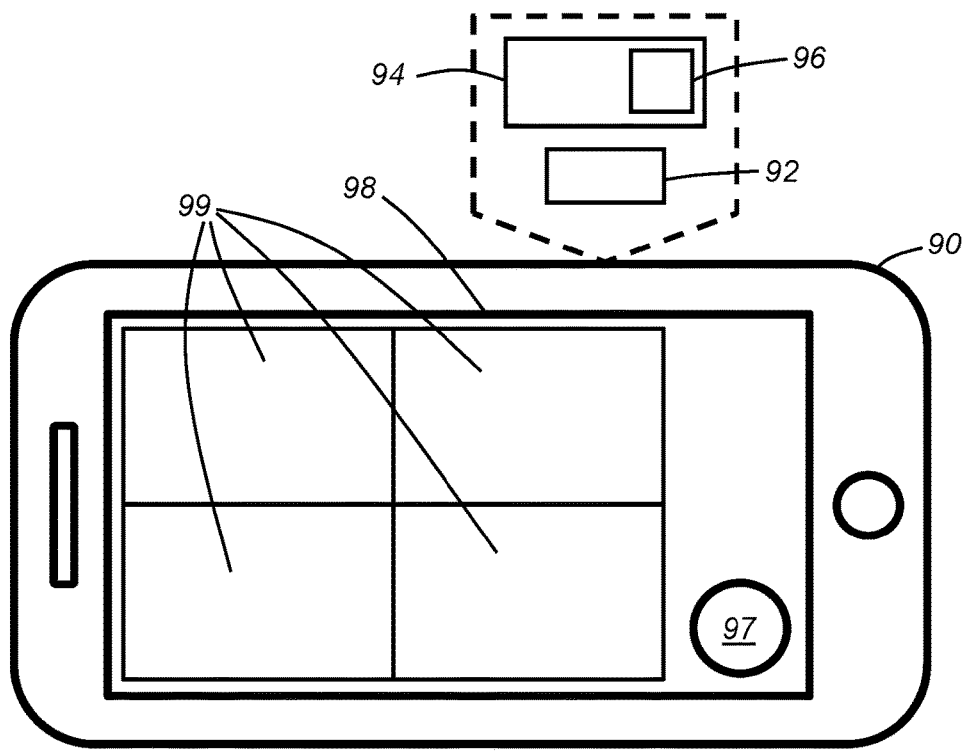
FIG. 3 illustrates the personal mobile device of FIG. 1 together with a vehicle remote control application and its user interface on the mobile device.

The remote vehicle control and command execution surveillance is carried out via a personal mobile device such as smartphone 90. As used herein, a personal mobile device is a mobile device that: (1) includes an electronic processor, computer-readable memory, software stored on the memory, display screen, and at least one user input device for receiving user commands; (2) is capable of wireless communications; and (3) is portable by a user either as a handheld device (e.g., a smartphone, tablet, or laptop), a wearable device (e.g., a smartwatch or smart glasses), or an implantable device that is incorporated into the user. Referring briefly to FIG. 3, the hardware of personal mobile device 90 (also referred to herein as smartphone 90) includes an electronic processor 92 and computer-readable memory 94 (e.g., non-transitory computer readable medium configured to operate with the processor) for storing software such as an Android™ or iOS™ operating system and including the remote application 96. The personal mobile device's processor 92 is configured to execute the remote application 96 to carry out a portion of the vehicle remote control and monitoring steps described herein. The remote application 96 may be installed by the user as a downloaded app, and may comprise a software application provided by the vehicle manufacturer or other telematics service provider. As will be described in further detail below, the remote application 96 provides the user of the smartphone 90 with a graphical user interface displayed on a touchscreen 98 of the smartphone 90 that enables user selection of the remote vehicle commands and that, for certain commands such as opening or closing of a vehicle rear closure, displays a live camera feed transmitted from one or more vehicle cameras at the vehicle to the smartphone 90 for viewing by the user.

Referring back to FIG. 1, vehicle 12 is depicted in the illustrated embodiment as a passenger car, but it should be appreciated that any other vehicle including trucks, sports utility vehicles (SUVs), recreational vehicles (RVs), marine vessels, aircrafts, etc., can also be used. Some of the vehicle electronics 20 are shown generally in FIG. 1 and includes a GPS module 22, engine control unit (ECU) 24, a body control module (BCM) 26, a wireless communications device 30, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GPS module 22, ECU 24, BCM 26, wireless communications device 30, and vehicle user interfaces 52-58, some of which will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. In one particular embodiment, BCM 26 may be isolated and connected to the wireless communications device 30 and select VSMs on an isolated portion of the bus 44, or connected to the wireless communications device 30 and select VSMs via a separate communications bus. BCM 26 can include an electronic processor and memory, which can be similar to processor 36 and memory 38 of wireless communications device 30, as discussed below. BCM 26 may communicate with wireless communications device 30 and/or one or more vehicle system modules, such as GPS 22, audio system 54, or other VSMs 42. BCM 26 may be programmed to direct one or more vehicle operations including, for example, controlling central locking, air conditioning, power mirrors, controlling the vehicle primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. Further, the wireless communications device 30 may provide the BCM 26 with information. For example, BCM 26 may receive a notification or indication from wireless communications device 30 that a certain wireless service is available (e.g., a wireless network connection is available) and/or that a remote connection has been established with a remote wireless device, such as mobile device 90.

Wireless communications device 30 is capable of communicating data via various communication technologies including both short-range wireless communication (SRWC) and cellular network communication. In other embodiments, the wireless communication device may include only one communication technology or may include one or more additional communication technologies. As shown in the exemplary embodiment of FIG. 1, wireless communications device 30 includes an SRWC circuit 32, a cellular chipset 34, a processor 36, memory 38, and antennas 40 and 50. In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), BCM 26, an infotainment module, a telematics unit, a head unit, and/or a gateway module. As will be appreciated by those skilled in the art, the device 30 can be implemented either as an OEM-installed (embedded) or aftermarket device that is installed in the vehicle as a part of the vehicle electronics 20.

SRWC circuit 32 is configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology.

Data communication to and from the vehicle using wireless communications device 30 may be by way of packet-switched data communication. This packet-switched data communication may be carried out by communication between the SRWC circuit 32 and any of the wireless network access points 74 within range of the vehicle. These WAPs 74 are non-vehicle wireless access points that provide connectivity for the vehicle to private and public networks such as the Internet. As used herein a "wireless network access point," or more simply, "wireless access point" (abbreviated "WAP") is a hardware and software device that communicates using short range wireless communication (SRWC) with client devices to provide the client devices with data access to computers and other devices via a wired and/or wireless connection from the WAP to a public or private network such as the Internet. The non-vehicle WAPs 74 are thus network access devices that enable vehicle 12 and/or smartphone 90 to communicate with remote devices and systems such as computer 78 and remote facility 80 via land network 76. As is known, the WAPs 74 includes an antenna to increase its reception and/or transmission of wireless signals and may include multiple antennas depending on, for example, the specific wireless protocol used (e.g., IEEE 802.11n). Additionally, the WAPs 74 may include a dual band transceiver that allows them to communicate on multiple wireless channels, such as the 2.4 GHz and 5 GHz frequency bands used by IEEE 802.11 (e.g., 802.11b/g/n and 802.11a/h/j/n/ac). When used for packet-switched data communication such as TCP/IP, the communications device 30 can be configured with a static IP address or can be set up to automatically receive an assigned IP address from the WAPs 74 such as using dynamic host configuration protocol (DHCP).

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a non-transitory computer-readable medium such as may be implemented using various forms of RAM or ROM, or optical or magnetic medium, or any other electronic computer medium that stores some or all of the software needed to carry out the various external device functions discussed herein. Processor 92 and its associated memory 94 of smartphone 90 may also be implemented using any of the processors and memory types noted above in conjunction with processor 36 and memory 38.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

Figure 2:
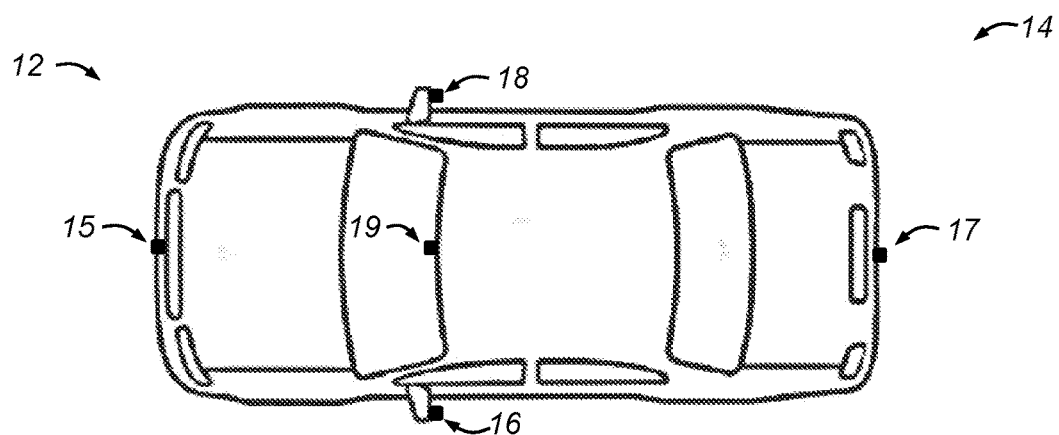
FIG. 2 is a plan view of the vehicle of FIG. 1 and depicting an exterior camera system on the vehicle.

Referring now to FIG. 2, there is shown a top-down view of a vehicle 10 with the camera system 14. The camera system 14 has a plurality of cameras 15-19 positioned in various locations on the vehicle 12. In the illustrated embodiment, the camera system 14 has five cameras positioned in different locations, including a front bumper camera 15, a left side mirror camera 16, a rear bumper camera 17, a right side mirror camera 18, and an internal cabin camera 19 mounted near the windscreen. These are but a few illustrative camera locations; it is appreciated that any vehicle location that enables a visual of the surroundings around the vehicle component for which the remote vehicle command may be used. The cameras 15-19 may be any suitable video-enabled camera installed in the vehicle as a part of the vehicle electronics 20. As indicated in FIG. 1, the cameras may be coupled to the vehicle communications bus 44 so as to provide the camera feed to the wireless communications device 30 for transmission to the personal mobile device 90, or may be connected directly to the device 30 or via a separate, more dedication bus, such as an audio/video (AV) network. The camera system may provide individual video streams from each camera, or may combine then into a single video stream. Some of all of the cameras 15-19 may be used in part for other vehicle purposes (e.g., backup camera or as a rear view mirror camera). Alternatively or additionally, one or more of the cameras 15-19, or any number of additional cameras, may be positioned specifically for viewing the vehicle component and surrounding area for which one or more of the remote vehicle commands are used.

Referring now to FIG. 3, there is shown the smartphone 90 with its touchscreen 98 displaying a graphical user interface generated by the remote application 96. The graphical user interface displays the camera feed from one or more of the cameras 15-19 on the touchscreen 98. In some of the embodiments that use video from more than one camera, the video output from two or more of the cameras 15-19 within the camera system 14 may be combined either within the camera system 14, the wireless communication device 30 or the vehicle electronics 20 more generally, thereby enabling the vehicle 12 to provide a single, composite video stream, or may be combined at the remote facility 80 or within the smartphone 14 using separate camera feeds coming from the vehicle 12. Techniques for combining separate video streams into a single composite video stream will be known to those skilled in the art. In the embodiment shown in FIG. 3, four live camera feeds are displayed in separate regions 99 of the touchscreen simultaneously for the user—either as separate camera feeds are as one combined camera feed. The number of live camera feeds displayed in the regions 99 may vary depending on multiple factors (e.g., which remote vehicle command is conducted, the orientation of each vehicle camera, the type of vehicle, etc.). In some embodiments, the user may select more than one remote vehicle command at the same time. If the combination of remote vehicle commands results in the need for a large number of live camera feeds 99, the remote vehicle commands may be conducted consecutively rather than simultaneously. The maximum number of live camera feeds 99 shown at one time may be determined by the speed of the remote vehicle command, the size of the screen of the mobile device 90 used, and/or any other relevant factor.

In the illustrated embodiment shown in FIG. 3, the graphical user interface created by the remote application 96 includes a user-selectable button that is implemented as a touchscreen touch button 97 on a mobile device 90. By presenting the button 97 simultaneously with the camera feeds 99, the user may be required to depress the button during the camera feed in order to cause the vehicle to carry out the function of moving the vehicle component (e.g., a rear trunk lid or liftgate). This results in a required simultaneous bi-directional communication between the remote application 96 and vehicle 12. That is, movement of the vehicle component may be restricted to occur only when the vehicle determines that (1) it is successfully sending the camera feed to the personal mobile device 90 and (2) is continuously receiving the selected remote vehicle command to move the vehicle component. The continuous sending (by the personal mobile device) and receiving (by the vehicle) of the selected remote vehicle command may be carried out either as a continuous data stream or as a repetitive sending of a command with no more than a desired maximum interval (e.g., 500 msec) between repeats of the command. As will be known by those skilled in the art, confirmation by the vehicle 12 that the camera feed is being successfully received by the personal mobile device 90 may be carried out in various ways using TCP/IP or other data protocols that provide sufficient handshaking or other confirmation of receipt of the data at the terminal device.

In other embodiments, rather than the button 97, the continuous provision of the selected vehicle command by the user may be implemented in other ways, including any approach that enables either temporary engagement with the user or constant engagement with the user before, during, and/or after the remote vehicle command is conducted. For example, the application may use facial recognition technology to tell when the user is looking at the mobile device screen. When the facial recognition technology recognizes that a user is looking at the mobile device screen, the application enables the operation of the remote vehicle command, and when the facial recognition technology recognizes that a user is no longer looking at the mobile device screen, the application sends a signal to the vehicle to cease operation. In this embodiment, a user looking at the screen is equivalent to a user activating the button 97, and a user looking away from the screen is equivalent to a user deactivating the button 97. In some other non-limiting embodiments, the button may be a touchscreen slide-and-hold button, a touchscreen pattern button, or a mechanical push-and-hold button.

Figure 4:
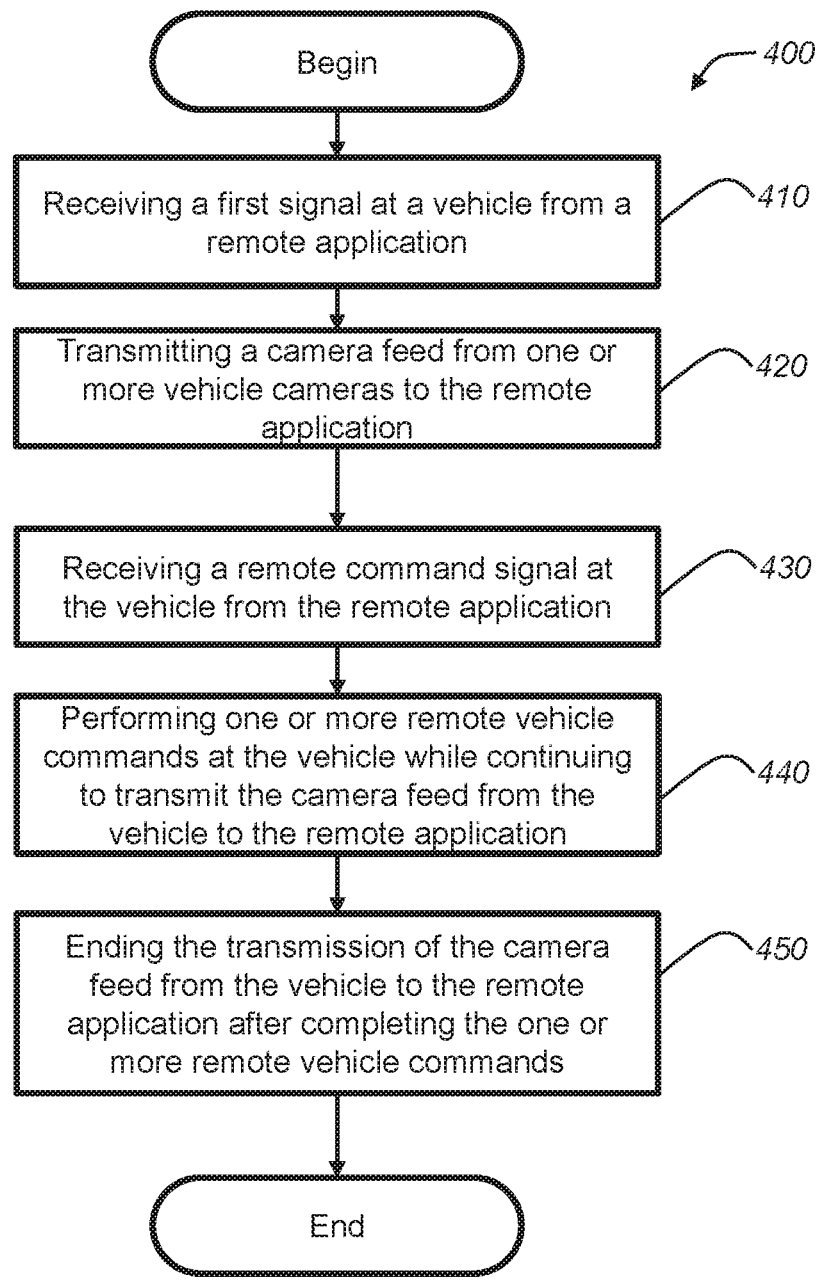
FIG. 4 is a flowchart illustrating steps carried out at the vehicle of FIG. 1 according to an embodiment of a method for performing remote vehicle commands.
Figure 5:
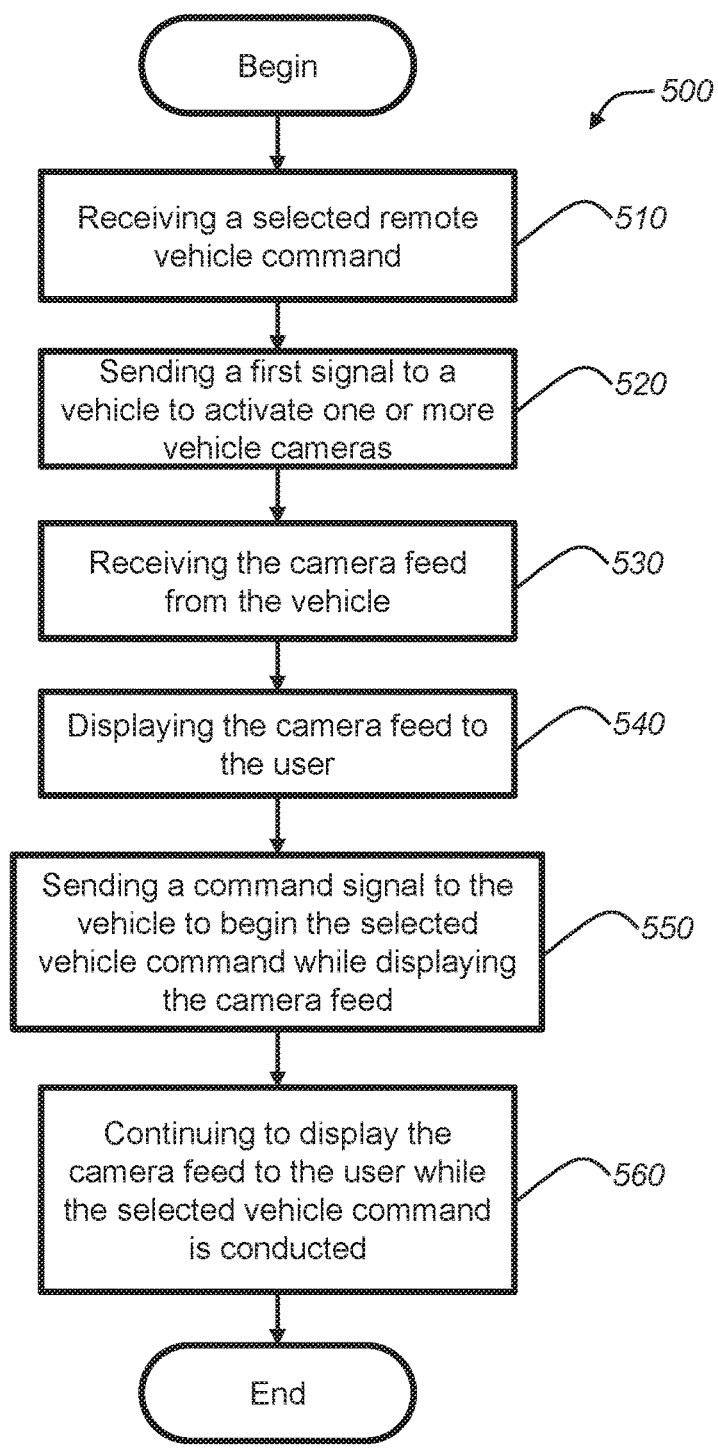
FIG. 5 is a flowchart illustrating steps carried out at the personal mobile device of FIG. 1 in conjunction with the steps of FIG. 4 to carry out portions of the method for performing remote vehicle commands using the vehicle remote control application.

Referring now to FIGS. 4 and 5, an exemplary method of performing remote vehicle commands will now be described, with the method 400 of FIG. 4 depicting the steps carried out at the vehicle, and method 500 of FIG. 5 depicting the steps carried out at the personal mobile device 90. Method 400 begins with step 410 wherein a first signal is received at a vehicle from a remote application. This first signal may be generated in response to the user indicating a request to perform a selected remote vehicle command that involves physical movement of a vehicle component. This command request signal is transmitted from the remote application 96 to the vehicle wireless communications device 30. In response, the vehicle wireless communications device may then activate the camera system 14 and one or more of its cameras 15-19 that relate to the designated remote vehicle command indicated by the first signal. The method 400 continues to step 420.

In step 420, a camera feed from one or more vehicle cameras is transmitted to the remote application, either via cellular communication over the wireless carrier system 70 or via SRWC using, for example, a WAP 74 if nearby and available. If multiple camera feeds are needed for the particular vehicle command selected by the user, then the vehicle may use onboard software to combine multiple camera feeds for display to the application user. In other embodiments, the desired camera feed(s) may be sent separately. As noted above, during transmission of the camera feed, the vehicle 12 may determine, or receive confirmation, that the camera feed is being delivered successfully to the personal mobile device. Using this, the vehicle may be configured to carry out the selected vehicle command only during successful camera feed receipt by the personal mobile device. For example, the vehicle 12 may monitor a quality of connection (QoC) metric indicating the speed and/or quality of video data transmission to the smartphone 90. Using this, the vehicle may be configured to send the camera feed or, if sent, carry out the selected vehicle command only if the quality of connection is above a threshold. The QoC may be represented as a single number (e.g., 0-100 with larger numbers indicating a higher quality connection) that may be compared to a threshold number representing the minimum allowable connection quality during which the command may be carried out. As will be appreciated by those skilled in the art, the QoC may be determined using any one or more suitable transmission characteristics, including data rate, bit error rate, frame rate, latency, or wireless signal strength.

In step 430, a remote vehicle command signal is received at the vehicle from the remote application. The vehicle command signal may be a signal instructing the vehicle to conduct the remote vehicle command originally indicated by the user that was used to initiate the camera feed, and this may be generated by the user pressing the button 97 on the smartphone 90 during the camera feed display. As noted above, the selected vehicle command may be, for example, a command to open or close a door, trunk lid, liftgate, window, sunroof, moonroof, or convertible top of the vehicle, with the camera feed providing video showing the vehicle component as it moves.

In step 440, the selected remote vehicle command is performed at the vehicle while continuing to transmit the camera feed from the vehicle to the remote application. Performance of the vehicle command may be slowed down or interrupted depending on the number of camera feeds being viewed by the user, the lag time of the camera feed transmission, an input from a vehicle sensor and/or a user input. In some embodiments, the performance of one or more vehicle commands may cease in response to an interruption or stoppage of receipt of the remote vehicle command. Such an interruption or stoppage may be caused by a user exiting the remote application, releasing the button, a lag time extending beyond a predetermined threshold (e.g., due to the QoC exceeding the threshold), a user input, or some other means of severing the receipt of the continuously-transmitted remote vehicle command.

The vehicle may emit an audible warning, a visual warning, or both at the vehicle while conducting the one or more remote vehicle commands at the vehicle. In one embodiment, the vehicle may conduct a countdown, such as "3 . . . 2 . . . 1 . . . closing," in order to alert nearby pedestrians of a closing door, window, sunroof, or top. In another embodiment, the vehicle may emit a visual warning using the vehicle lighting already part of the vehicle (e.g., headlamps, tail lamps, emergency flashing lights, etc.) or may use some other lighting or display system (e.g., a flashing pedestrian symbol). The method 400 continues to step 450.

In step 450, the transmission of the camera feed from the vehicle to the remote application ends after completing the one or more remote vehicle commands. In some embodiments, a completion signal may be sent to verify successful completion of the selected vehicle command. Where there is more than one vehicle command requested, they may be conducted simultaneously or, in other embodiments, one vehicle command will not commence until the previous command has been completed. In yet other embodiments, some vehicle commands may be conducted simultaneously while other ones may need to begin after one or more of the other vehicle commands has concluded. The method 400 ends.

Referring now to FIG. 5, there will be described the method 500 for using the remote application 96 to initiate and carry out a selected remote vehicle command. The method 500 begins after the remote application 96 is launched and proper login or other credentials are provided to the remote facility 80 or vehicle 12 to authorize and/or authenticate the smartphone 90. Once that is complete, then at step 510 options are offered to the user for sending one or more remote vehicle commands to the vehicle 12. Options may be presented to the user in a variety of ways. In one embodiment, the graphical user interface of the remote application 96 provides the user with a list of remote vehicle commands that may be selected via the touchscreen 98. In another embodiment, the user may verbally select one or more remote vehicle commands from a predetermined vocabulary list of remote vehicle commands. Further embodiments may include confirmation from the remote application to the user of the selected remote vehicle commands through audio, a screen display, or both. In one embodiment, the application may use previous user information to determine additional options the user may require and suggest the additional remote vehicle commands. The previous user information may be based on options that are often chosen together, options that occur at certain times of the day, and other applicable user information. The method 500 continues to step 520.

In step 520, a first signal is sent to a vehicle to activate one or more vehicle cameras. In some embodiments, the remote application may first determine which, if any, of the remote vehicle commands requires a camera feed before sending the signal to the vehicle to activate the one or more vehicle cameras. The method 500 continues to step 530 in which the camera feed is received from the vehicle. If the camera feed is being received from more than one camera, a multiplexer may be used to simultaneously display the multiple camera feeds to the user. The method 500 continues to step 540.

In step 540, the button 97 is displayed to the user on the touchscreen 98 along with the camera feed in one or more of the regions 99. The remote application 96 may be configured to send the continuous command signal to the vehicle 12 only while the button 97 is pressed by the user, with the vehicle performing the selected vehicle command only while receiving the continuous command signal. In other embodiments, an initiating command may be sent from the smartphone (e.g., using button 97) which causes the vehicle to begin performing the selected vehicle command, without requiring a continuous button press. In such embodiment, the vehicle operation may continue until complete as long as the camera feed continues during the operation, even though a continuous command signal is not being received.

As noted above, the quality of connection (QoC) may be monitored to ensure that the selected vehicle command is only carried out while a proper camera feed is present. Determination of the QoC may be carried out as described above, either at the vehicle, or at the personal mobile device. For the latter, the remote application 96 may be configured to only send the command signal when it detects a proper quality of camera feed (e.g., when the QoC metric determined by the smartphone is above a threshold). Furthermore, the remote application 96 may be configured to grey out the displayed button and make it inoperable during times of poor camera feed, such that the user has a visual indication that continuing operation of the selected vehicle command is not available due to the interrupted or poor quality of camera feed. Once the quality of the camera feed has risen above or met the predetermined threshold, the button can be re-enabled and shown full brightness or full color to indicate that it may again be pressed to carry out or continue the selected vehicle command.

In step 550, in response to the further input from user (e.g., the button press, verbal command, or otherwise), the command signal is sent to the vehicle to begin the one or more remote vehicle commands. As discussed above, this command signal may be a one-time signal that causes the vehicle command to be executed and continued as long as the camera feed is present, or may be a continuous signal (continuous data stream or a repeating command) that must be sent for the duration of the selected vehicle command operation.

In step 560, the camera feed is continually displayed to the user on the personal mobile device while the selected remote vehicle command is conducted. Once the remote vehicle command has been conducted, the vehicle may send a signal to the remote application indicating completion of the remote vehicle command. The remote application may be configured to display a notification on the personal mobile device indicating that the selected remote vehicle command was completed. In another embodiment, the user may see through the one or more live camera feeds that the remote vehicle command is complete and may deactivate the button, close the application, or otherwise indicate to the application to sever the second signal to the vehicle. Other embodiments may include combinations and variations of the disclosed embodiments. The method 500 ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method for performing remote vehicle commands, the method comprising:
    receiving a first signal at a vehicle from a remote application via a wireless communication device installed in the vehicle as a part of the vehicle electronics;
    in response to receiving the first signal, transmitting a camera feed from one or more vehicle cameras on the vehicle to the remote application via cellular communication over a wireless carrier system or via short range wireless communication via a wireless network access point;
    receiving a remote command signal at the vehicle from the remote application;
    in response to receiving the remote command signal, performing one or more vehicle commands at the vehicle while continuing to transmit the camera feed from the vehicle to the remote application; and
    ending the transmission of the camera feed from the vehicle to the remote application after completing the one or more remote vehicle commands;
    wherein the performing step further comprises physically moving an internal or external vehicle component while transmitting a camera feed of the moving vehicle component to the remote application;
    wherein the vehicle component is one of a door, trunk lid, liftgate, window, sunroof, moonroof, or convertible top of the vehicle; and
    wherein the camera feed provides video showing the vehicle component as it moves.

2. The method of claim 1, wherein the performing step is carried out only during simultaneous bi-directional communication between the vehicle and the remote application that includes sending of the camera feed from the vehicle to the remote application and receiving a command signal from the remote application at the vehicle.

3. The method of claim 1, further comprising the step of emitting an audible warning, a visual warning, or both at the vehicle while conducting the one or more remote vehicle commands at the vehicle.

4. The method of claim 1, further comprising, prior to the transmitting step, the step of verifying that a quality of connection between the vehicle and the remote application is above a threshold.

5. The method of claim 1, further comprising the step of ceasing performance of one or more vehicle commands based on an input from a vehicle sensor.

6. The method of claim 1, further comprising the step of continuously receiving the remote vehicle command signal while the vehicle conducts the one or more remote vehicle commands.

7. The method of claim 6, further comprising the step of ceasing performance of one or more vehicle commands in response to an interruption or stoppage of receipt of the remote vehicle command.

8. A method for performing remote vehicle commands using a personal mobile device, the method comprising:
    receiving from a user at a personal mobile device a selected remote vehicle command that involves physical movement of at least one vehicle component of a vehicle;
    sending a first signal to the vehicle to activate one or more vehicle cameras on the vehicle;
    receiving a camera feed from the vehicle cameras;
    displaying the camera feed to the user on the personal mobile device;
    during the display of the camera feed, receiving a further input from the user requesting that the selected remote vehicle command be carried out and sending a command signal to the vehicle to begin the selected remote vehicle command; and
    continuing to display the camera feed to the user while the selected remote vehicle command is performed by the vehicle;
    wherein the selected remote vehicle command comprises a command to move an internal or external vehicle component of the vehicle;
    wherein the vehicle component is one of a door, trunk lid, liftgate, window, sunroof, moonroof, or convertible top of the vehicle; and
    wherein the received camera feed provides video showing the vehicle component as it moves.

9. The method of claim 8, wherein the steps are carried out via a vehicle remote control application executing on the personal mobile device, wherein, prior to the sending step, the remote control application transmits user identification information to a remote facility that authorizes the user's access to the vehicle to carry out the selected remote vehicle command.

10. The method of claim 8, wherein the camera feed is displayed on a touchscreen of the personal mobile device and wherein the method further comprises the step of displaying a button on the touchscreen while displaying the camera feed to the user.

11. The method of claim 10, wherein the step of sending the command signal to the vehicle is carried out only while the user presses the button on the touchscreen.

12. The method of claim 11, wherein the step of sending the command signal further comprises continuously sending the command signal only while the user presses the button on the touchscreen and the camera feed is being displayed on the touchscreen.

13. The method of claim 8 further comprising the step of monitoring a quality of connection of the camera feed.

14. The method of claim 13, wherein the method further comprises determining that the quality of connection of the camera feed has dropped below a threshold and in response thereto, either stopping transmission of the command signal or sending a stop command to the vehicle so as to cause the vehicle to cease conducting the selected remote vehicle command.

15. The method of claim 14, further comprising the step of providing a notification to the user via the personal mobile device that the quality of connection of the camera feed has dropped below the threshold.

16. The method of claim 8, further comprising the steps of receiving a completion signal at the personal mobile device after the vehicle has performed the selected remote vehicle command, and displaying a notification on the personal mobile device indicating that the selected remote vehicle command was completed.

* * * * *